Oct. 20, 1953  D. M. SMITH  2,656,071
SEED PLANTER
Filed Jan. 24, 1951  2 Sheets-Sheet 1
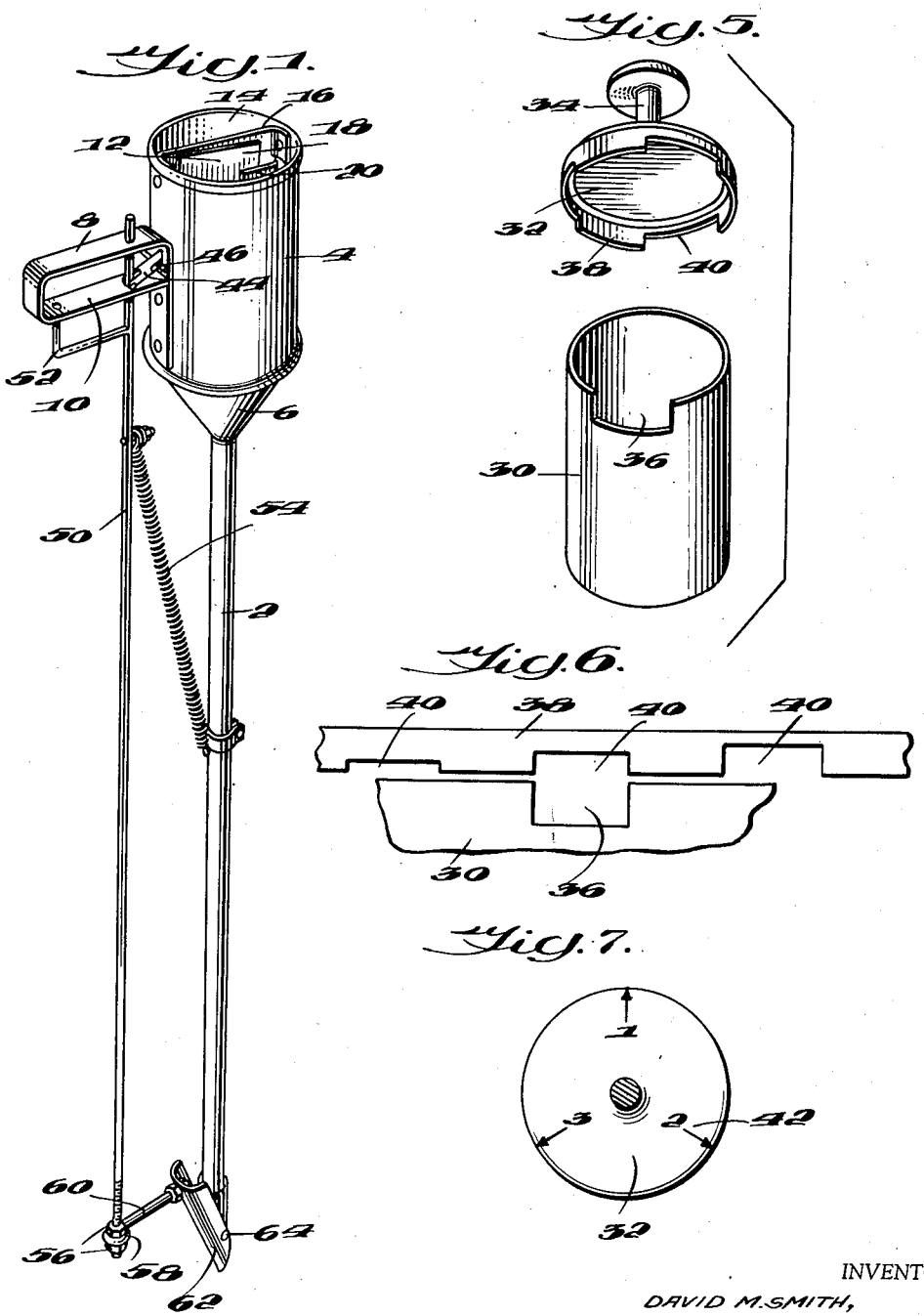
INVENTOR
DAVID M. SMITH,
BY *Bailey, Stephens & Huettig*
ATTORNEYS

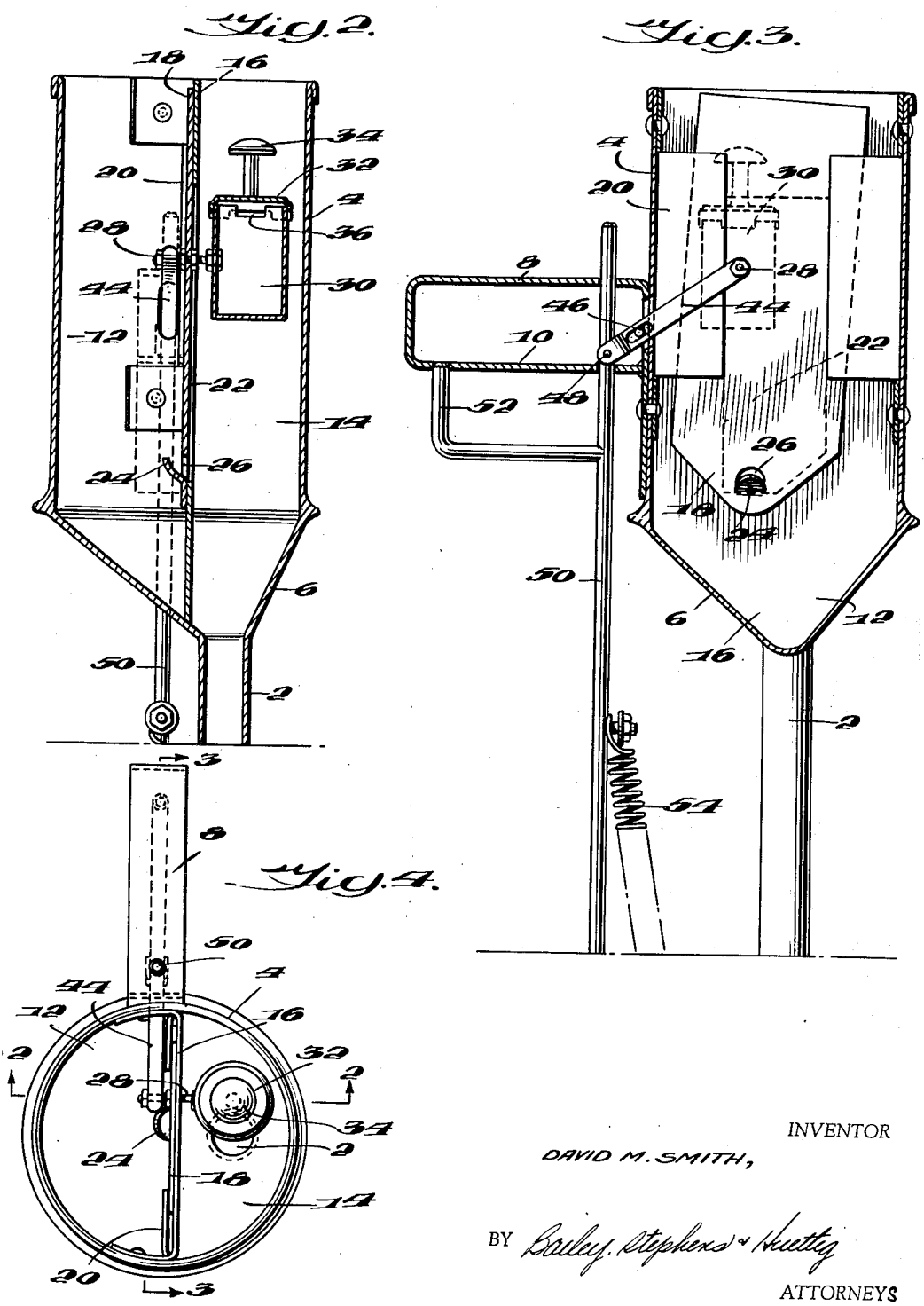

Patented Oct. 20, 1953

2,656,071

UNITED STATES PATENT OFFICE 2,656,071

SEED PLANTER

David M. Smith, Durham, N. C., assignor to Smith Implement Company, Durham County, N. C., a corporation of North Carolina Application January 24, 1951, Serial No. 207,510

8 Claims. (Cl. 222—133)

The invention relates to seed planting devices, and especially to devices of a type primarily intended for hand use.

Many devices have been suggested for the planting of seeds. Most of these will handle only large or small seeds, while those which can operate with all sizes of seeds require complicated interchange of parts when the size of the seed being planted varies.

The primary object of the present invention is to provide a hand seeder capable of handling either small or large seeds without any interchange of parts.

Another object of the invention is to provide a device of this type which can be constructed simply and inexpensively.

A further object of the invention is to provide a device of this type which has only a few moving parts, and these of a simple nature.

Still another object of the invention is to provide a seeding device which can be readily adjusted to handle and distribute along a row small seeds of differing sizes.

Still a further object of the invention is to provide a hand seeding device which can, if desired, simultaneously sow both small and large seeds along the same row.

Further objects and advantages of the invention will appear more fully from the following description, especially when taken in conjunction with the accompanying drawings which form a part thereof.

In the drawings:

Fig. 1 shows in perspective a seed planter embodying my invention;

Figs. 2 and 3 are vertical cross-sections through the top part of the planter substantially on the lines 2—2 and 3—3 respectively of Fig. 4;

Fig. 4 is a top plan view of the planter;

Fig. 5 is a perspective view of the parts of the small seed dispenser;

Fig. 6 is a diagram showing the openings therein; and

Fig. 7 is a top plan view thereof with the handle cut away.

The seed planter includes an elongated hollow tube 2, on the top of which is eccentrically mounted a circular chamber 4 having a conical bottom 6, the apex of this cone being off center and communicating with tube 2. A handle having upper and lower bars 8, 10 is suitably secured on one side of chamber 4.

Chamber 4 is divided into two compartments, a large seed compartment 12 and a dispensing and small seed compartment 14, by a wall 16 running vertically the length of the compartment and a vertically slidable plate 18 guided between wall 16 and flanges 20 turned back from the edge of the wall. The wall 16 has an opening 22 therein which is closed by plate 18. The lower end of plate 18 is pointed, and near the lower end is a tongue 24 struck out from the plate into chamber 12 and leaving an opening 26 in the plate. In the normal, or upper, position of plate 18 this opening coincides with the lower part of opening 22 in wall 16, as shown in Figs. 2 and 3.

A pin 28 is fixed in plate 18 and extends therefrom into compartment 12 on the one hand and through opening 22 of wall 16 into compartment 14 on the other hand. On this pin within compartment 14 is mounted a small seed container comprising a cylindrical can 30 having a removable top 32 provided with a handle 34. In the upper edge of can 30 (see Figs. 5 and 6) is a notch 36, while in the downwardly turned flange 38 of cap 32 are three notches 40 of different depth. On the top of the can (see Fig. 7) are indicia 42 corresponding to and located opposite the three notches 40.

A lever 44 is pivoted on the other end of pin 28, within compartment 12, and extends through a slot in the wall of cylinder 4, where it fulcrums by a slot on pin 46. The other end of the lever is pivoted at 48 to a rod 50 slidable vertically in handle bars 8, 10 and prevented from turning by a lateral extension 52 slidable in bar 10. A spring 54 secured to rod 50 and tube 2 pulls the rod downward. The lower end of the rod is threaded and carries two nuts 56 between which is a ring 58 on a rod 60 which is connected to a closure member 62 for the bottom end of the tube pivoted thereon at 64.

The operation of this device is as follows:

When large seed (such as corn, peas or beans) are to be planted, they are placed into compartment 12, but not up to the level of tongue 24. When the handle is gripped along with projection 52 of rod 50 and squeezed, rod 52 is lifted and plate 18 is depressed. At the same time, closure 62 is swung to open the lower end of tube 2. Tongue 24 descends into the mass of seed and picks up one seed.

When rod part 52 is released, spring 54 restores the rod to its normal position, closing the lower end of tube 2 and raising plate 18. When the tongue 24 reaches the position shown in Fig. 3, the seed carried thereby drops through openings 26, 22 into compartment 14 and thence to the bottom of tube 2. On the next operation, this seed will be dropped when closure 62 is opened.

If small seed (such as lettuce, radish or turnip) are to be planted, they are placed into container 30 and the cover 32 is applied into a position depending on the size of the seed. For the smallest seed, such as lettuce, the smallest notch 40 is placed opposite notch 36 in container 30, leaving only a small opening, which can be still further reduced, if desired, by turning the top somewhat. Nuts 56 are adjusted upward on rod 50 so as to hold closure member 62 slightly open at all times. Now then rod 52 is moved up and down and moves plate 18, it joggles the container 30 sufficiently to throw out small quantities of seed at each operation. These seed fall through compartment 14 and tube 2 to the ground.

In sowing small seed, it is best to draw the lower end of tube 2 along the row, shifting the rod 50 up and down as the user walks backwards along the row. A sufficiently even distribution of small seed can be obtained in this manner. Large seed can be planted in the same fashion, or can be planted one by one using the end of the tube as a dibble.

While I have described herein one embodiment of my invention, I wish it to be understood that I do not intend to limit myself thereby except within the scope of the claims hereto or hereinafter appended.

I claim:

1. A seed planter comprising an elongated tube, means forming a chamber at the upper end of the tube, a plate, means mounting said plate within said chamber for sliding movement, said mounting means and plate dividing the chamber into two compartments, said tube communicating with the first of said compartments, means responsive to sliding movement of the plate to transfer large seeds from the second compartment to the first compartment, and a container carried by the plate within the first compartment, said container having at least one restricted opening near its top.

2. A seed planter comprising an elongated tube, means forming a chamber at the upper end of the tube, a plate, means mounting said plate within said chamber for sliding movement, said mounting means and plate dividing the chamber into two compartments, said tube communicating with the first of said compartments, means responsive to sliding movement of the plate to transfer large seeds from the second compartment to the first compartment, and means in the first compartment responsive to movement of the plate to feed small seeds to the tube.

3. A seed planter comprising an elongated tube, means forming a compartment communicating with the upper end of the tube, a container within said compartment having a restricted opening adjacent its top and being closed below said opening, means mounting said container for up and down movement within the compartment, and means holding said container substantially vertical during such movement, said container comprising a cylindrical body having a removable cover and said opening being a notch in the upper edge of the cylindrical body.

4. In a device as claimed in claim 3, said cover having a downwardly turned edge having notches of differing depth therein to cooperate with the notch in the body.

5. A seed planter comprising an elongated tube, means forming a chamber at the upper end of the tube, a plate, means mounting said plate within said chamber for sliding movement, said mounting means and plate dividing the chamber into two compartments, said tube communicating with the first of said compartments, said plate having an opening therein and a tongue projecting therefrom below the opening into the second of said compartments, a fixed plate having an opening therein adapted to mate with the opening in the sliding plate when the sliding plate is in raised position, so as to transfer large seed one by one from the second compartment to the first compartment, and a container carried by the first plate within the first compartment, said container having at least one restricted opening near its top.

6. A seed planter comprising an elongated tube, means forming a chamber at the upper end of the tube, a plate, means mounting said plate within said chamber for sliding movement, said mounting means and plate dividing the chamber into two compartments, said tube communicating with the first of said compartments, said plate having an opening therein and a tongue projecting therefrom below the opening into the second of said compartments, a fixed plate having an opening therein adapted to mate with the opening in the sliding plate when the sliding plate is in raised position, so as to transfer large seed one by one from the second compartment to the first compartment, and means in the first compartment responsive to movement of the first plate to feed small seeds to the tube.

7. In a device as claimed in claim 5, said container comprising a cylindrical body having a removable cover and said opening being a notch in the upper edge of the cylindrical body.

8. In a device as claimed in claim 7, said cover having a downwardly turned edge having notches of differing depth therein to cooperate with the notch in the body.

DAVID M. SMITH.

References Cited in the file of this patent

UNITED STATES PATENTS

| Number | Name | Date |
|---|---|---|
| 15,616 | Martratt | Aug. 26, 1856 |
| 92,632 | More | July 13, 1869 |
| 401,584 | Parry | Apr. 16, 1889 |
| 591,216 | Griffin | Oct. 5, 1897 |
| 927,084 | Thomas | July 6, 1909 |
| 1,124,523 | Reeser | Jan. 12, 1915 |
| 1,296,267 | Chantler | Mar. 4, 1919 |
| 2,136,805 | Scharinger | Nov. 15, 1938 |
| 2,196,289 | Bracchiglione | Apr. 9, 1940 |

FOREIGN PATENTS

| Number | Country | Date |
|---|---|---|
| 4,198 | Great Britain | June 15, 1911 |
| 75,599 | Sweden | Oct. 18, 1932 |